United States Patent [19] [11] 4,453,784
Kildea et al. [45] Jun. 12, 1984

[54] MEANS FOR FEEDING OIL BETWEEN COUNTERROTATING SHAFTS

[75] Inventors: Robert J. Kildea, Juno Isles; Jorge A. Alcorta, Hobe Sound; Robert B. Richardson, Juno, all of Fla.

[73] Assignee: United Technologies Corporation, Hartford, Conn.

[21] Appl. No.: 490,699

[22] Filed: May 2, 1983

[51] Int. Cl.³ ............... F16C 33/66; F01D 25/18
[52] U.S. Cl. ............... 308/187; 184/6.11; 415/111; 415/175
[58] Field of Search ............ 308/184 R, 187, 189 R, 308/207 R, 216, DIG. 15; 415/110, 111, 112, 113, 175; 184/6.11; 384/322, 397, 398

[56] References Cited
U.S. PATENT DOCUMENTS

| | | | |
|---|---|---|---|
| 2,929,663 | 3/1960 | Hoeltje | 308/187 |
| 3,243,243 | 3/1966 | Diver et al. | 308/187 |
| 3,756,672 | 9/1973 | Hibner et al. | 308/184 R |
| 4,265,334 | 5/1981 | Benhase, Jr. | 184/6.11 |
| 4,378,197 | 3/1983 | Cattaneo et al. | 415/175 |

Primary Examiner—John Petrakes
Assistant Examiner—David Werner
Attorney, Agent, or Firm—Stephen E. Revis

[57] ABSTRACT

Concentric, counterrotating shafts include means for bringing oil from within the inner shaft across an annular gap between the two shafts into oil scoops which rotate with the outer shaft. To minimize the splashing of oil as it travels across the annular gap between the two shafts a plurality of separate, circumferentially spaced apart oil compartments are disposed around the outer circumference of the inner shaft and rotate therewith. Oil from within the inner shaft travels radially outwardly through passageways in the shaft into the oil compartments whereupon the radial velocity of the oil is reduced to zero. The oil leaves the compartment through outlets and is slung across the gap between the shafts whereupon it is captured by oil scoops and is fed to its final destination, such as to a bearing race disposed radially outwardly of the outer shaft. By reducing the radial velocity of the oil to zero after it is passed through the inner shaft and prior to its being slung across the annular gap between the shafts, the amount of splashing of the oil is reduced.

5 Claims, 4 Drawing Figures

MEANS FOR FEEDING OIL BETWEEN COUNTERROTATING SHAFTS

The Government has rights in this invention pursuant to Contract No. F33657-79-C-0730 awarded by the Department of the Air Force.

CROSS REFERENCE TO RELATED PATENT APPLICATIONS

This application is of related subject matter to commonly owned U.S. Pat. application Ser. No. 490,700 filed on even data herewith titled "Oil Capture Scoop" by Jorge A. Alcorta and Robert J. Kildea.

TECHNICAL FIELD

This invention relates to intershaft bearings and means for providing oil thereto.

BACKGROUND ART

Twin spool gas turbine engines and other kinds of rotating machinery may include concentric shafts which rotate at different speeds or in opposite directions. In some cases one shaft may be supported from the other through a bearing. It is typical of the prior art to bring oil to the inner race of a bearing through passageways in the shaft to which the inner race is attached. If the bearing is external of the outer shaft, and if the oil supply for the bearing comes from within the inner shaft, the oil must be brought across the annulus between the inner and outer shaft and thence to the inner race of the bearing. Depending upon the bearing and shaft arrangement and the relative axial velocity of one shaft to the other, certain problems may arise in transferring the oil from the inner shaft radially across the annulus to the outer shaft. For example, due to large centrifugal forces, it is difficult to prevent the oil from splashing as it strikes the outer shaft after flowing across the annulus. Splashing produces an oil mist within the annulus which can be swept away by air flow through the annulus. Over a period of time the loss of oil may be significant. If temperatures, temperature gradients and the relative angular velocities of the shafts permit, annular intershaft seals may be disposed on either side of the oil stream flowing across the annulus to prevent loss of the oil mist. Close seals may not be possible in situations where high temperatures, large thermal gradients, and high relative angular velocities are present. It is to these latter problems that the present invention is directed.

Commonly owned U.S. Pat. No. 3,756,672 is directed to damping shaft vibrations of two concentric rotating shafts wherein one shaft is supported from the other shaft by means of a bearing disposed therebetween. Several bearing and shaft arrangements are shown. None of them appear to have the problems which the present invention is intended to solve.

DISCLOSURE OF INVENTION

One object of the present invention is to enable oil to be brought from within one shaft to a concentric surrounding shaft across an annular gap therebetween with a minimum of splashing, and a minimum of oil being carried away by the air flow through the annulus even if one shaft has a high angular velocity relative to the other shaft.

In accordance with the present invention, a shaft assembly comprises an inner shaft surrounded by a sleeve fixed relative thereto defining a first annulus therebetween; a plurality of separate oil compartments within the first annulus for receiving oil from within the inner shaft, each compartment having an inlet and outlet, the oil inlets to each oil compartment being radially misaligned with the oil outlet of its respective compartment; an outer shaft surrounding and spaced from the sleeve defining a second annulus therebetween; a bearing disposed outwardly of the second shaft and having its inner race fixed relative to the outer shaft; a plurality of circumferentially disposed recesses in the inside surface of the outer shaft substantially aligned with the oil compartment outlets for receiving oil therefrom; and passage means in fluid communication with the recesses for carrying oil therefrom through the outer shaft to the bearing inner race.

The present invention is particularly advantageous when the shafts are counterrotating. The oil compartments within the first annulus between the sleeve and the inner shaft interrupt the radial flow of oil before it is transferred across the annulus between the counterrotating shafts. The inlet into each oil compartment is radially misaligned with the outlet from the oil compartment such that the radial velocity of the oil is reduced to zero after it enters the compartment and flows either axially or circumferentially to the compartment outlet. Thus, the radial velocity of the oil as it travels across the annulus between the shafts is much reduced, thereby reducing splashing of the oil against the outer shaft.

In a preferred embodiment the recesses in the outer shaft which capture the oil from the oil compartments are in the form of a plurality of circumferentially, closely spaced apart scoops having opposed spaced apart wall surfaces which are oriented substantially parallel to the relative velocity vector of the jets of oil as they travel from the inner shaft across the annulus, thereby further reducing splashing of the oil as it enters the recesses.

The foregoing and other objects, features and advantages of the present invention will become more apparent in the light of the following detailed description of preferred embodiments thereof as shown in the accompanying drawing.

BRIEF DESCRIPTION OF THE DRAWING

FIG. 3 is a view taken along the line 3—3 of FIG. 1.

BEST MODE FOR CARRYING OUT THE INVENTION

Figure 1:
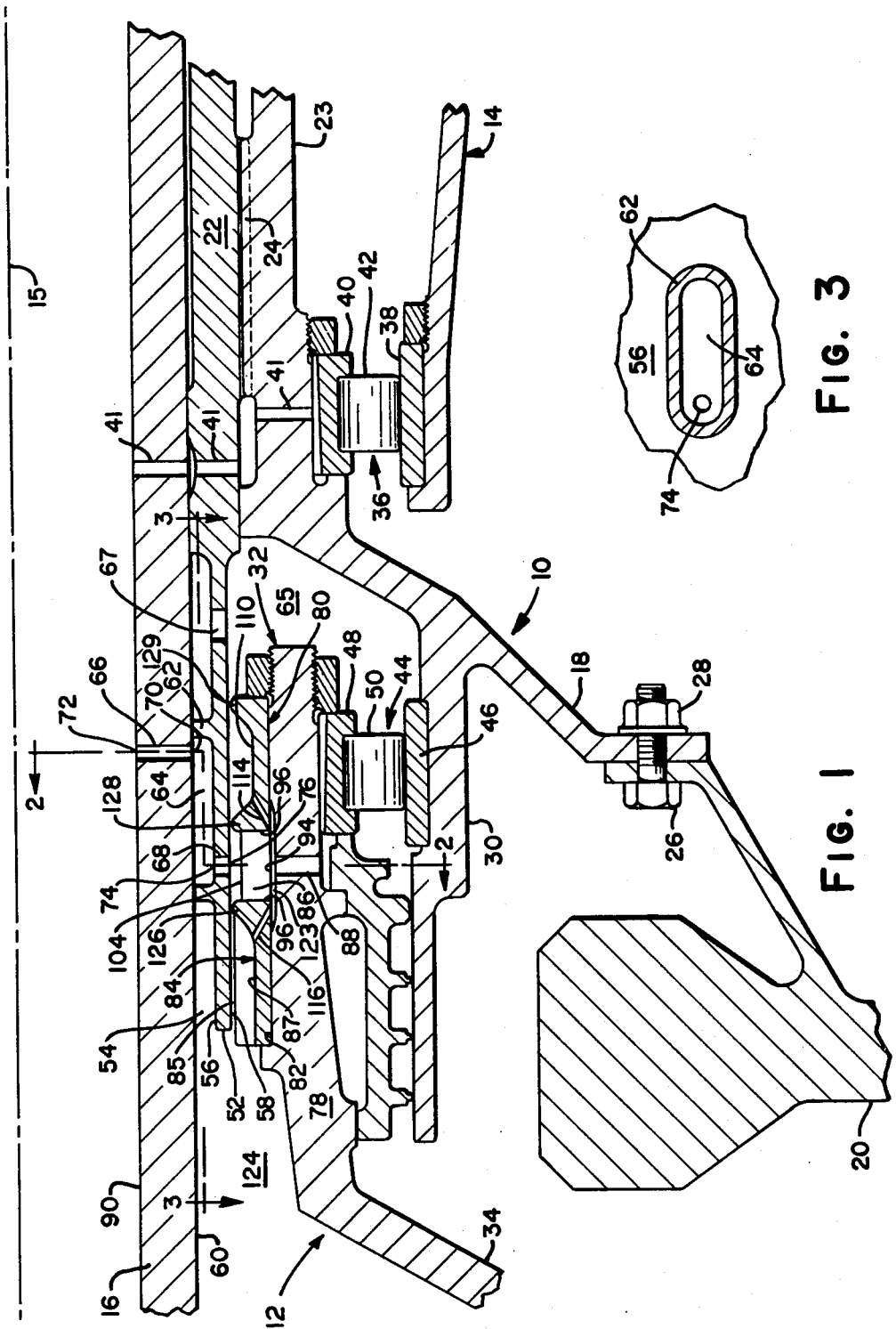
FIG. 1 is a simplified cross-sectional view of the rear bearing compartment portion of a dual spool gas turbine engine.

As an exemplary embodiment of the present invention consider the portion of a twin spool gas turbine engine shown in FIG. 1, which has been simplified for clarity. More specifically, what is shown in FIG. 1 is the rearward end portion of the low spool 10, the rearward end portion of the high spool 12, and a portion of nonrotating, fixed support structure 14. The low and high spools 10, 12 rotate counter to each other about the engine axis 15.

The low spool 10 comprises a main, hollow, inner shaft 16, a hub 18, a turbine wheel 20, a spline adapter 22, and a splined shaft 23 integral with the hub 18. The spline adapter 22 is fixed relative to the inner shaft 16 by means not shown. The hub 18 is also fixed relative to the main shaft 16 and rotates therewith through a spline connection 24 between the shaft 23 and the spline adapter 22. The turbine wheel 20, in this embodiment, is the last or furthest downstream stage of the low spool 10 and is attached to the hub 18 by means of bolts 26 and nuts 28. The low spool 10 also includes an outer bearing support shaft 30 concentric with the main shaft 16, integral with the hub 18, and extending axially upstream from the hub 18.

The portion of the high spool 12 shown in FIG. 1 comprises a shaft assembly 32 and a portion of a hub 34 integral with the shaft assembly 32. A turbine wheel of the high spool is attached directly to the hub 34, but is outside the view of FIG. 1. The shaft assembly 32 is disposed radially between the inner shaft 16 and outer shaft 30.

The low spool 10 is mounted for rotation with respect to the fixed support structure 14 and is supported by the structure 14 through a first roller bearing 36 disposed radially outwardly of the splined shaft 23 and downstream of the low spool hub 18. A ball bearing (not shown) supports the forward end of the low spool 10. The first bearing 36 comprises an outer race 38, and inner race 40, and a plurality of rolling elements 42 disposed therebetween. The outer race 38 is fixedly attached to the support structure 14; and the inner race 40 is fixedly attached to and rotates with the low spool 10. Oil is fed to the first bearing 36 from within the main shaft 16 by means of a plurality of radial holes 41 through, respectively, the main shaft 16 spline adapter 22 and splined shaft 23, which holes are in fluid communication with each other.

The aft end of the high spool 12 is supported or "hung" from the low spool 10 through a second roller bearing 44 disposed between the high spool shaft assembly 32 and the low spool outer shaft 30. The second bearing 44 includes an outer race 46, an inner race 48, and a plurality of rolling elements 50 disposed therebetween in conventional fashion. The outer race 46 is fixedly attached to the outer shaft 30 and rotates therewith; and the inner race 48 is fixedly attached to the shaft assembly 32 and rotates therewith.

The arrangement of shafts and bearings in this embodiment is sometimes referred to as a "piggyback" arrangement since the loads imposed upon the bearing 44, which directly supports the high spool 12, are ultimately passed through the bearing 36 which directly supports the low spool. It is this type of arrangement which sometimes requires, as in the present embodiment, that the oil being fed into a bearing jump across an annulus between shafts which are rotating at different speeds and/or in opposite directions.

In accordance with the present invention, the low spool 10 includes a sleeve 52 surrounding the main shaft 16 and radially spaced therefrom defining an axially extending annulus 54 therebetween. In this embodiment the sleeve 52 is integral with and a part of the spline adapter 22, although it need not be. The sleeve 52 has a radially inwardly facing surface 56 and a radially outwardly facing surface 58. Extending radially inwardly from the inwardly facing surface 56 to an outwardly facing surface 60 of the shaft 16 are a plurality of walls 62, each wall 62 defining a separate, axially elongated oil compartment 64 (see, also, FIG. 3). The oil compartments 64 are four in number, in the present instance, and are circumferentially and evenly spaced apart from each other. Each compartment 64 has associated with it an oil entrance passageway 66 through the shaft 16 and an oil exit passageway 68 through the sleeve 52. The oil entrance passageway 66 has an outlet 70 and an inlet 72. The oil exit passageway 68 has an inlet 74 and an outlet 76. The outlet 70 is intentionally not aligned with the inlet 74.

Figure 2:
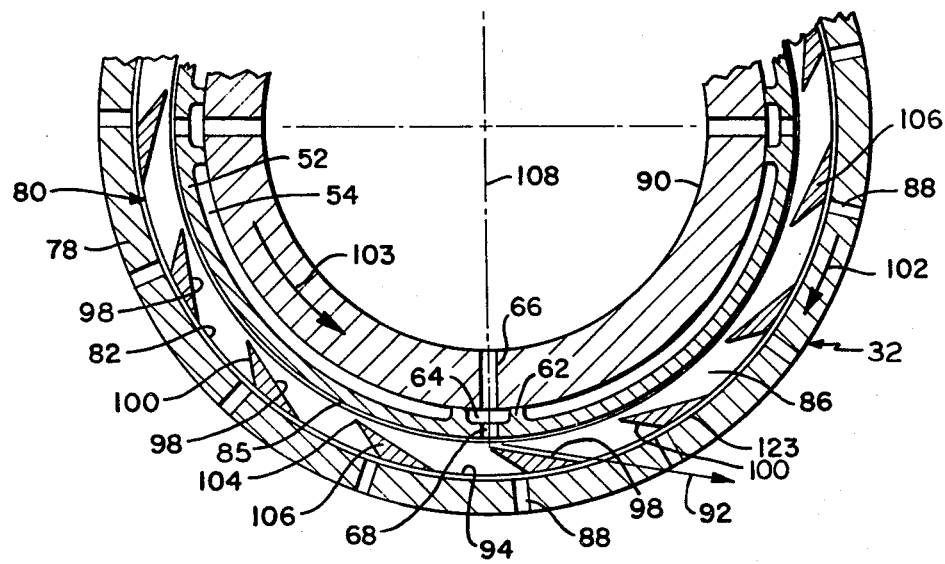
FIG. 2 is a sectional view taken along the line 2—2 of FIG. 1.

The shaft assembly 32 includes a shaft end portion 78 and an annular oil scoop ring 80. The ring 80 fits tightly against the inside surface 82 of the shaft end portion 78. The ring 80 is spaced radially outwardly from the surface 58 of the sleeve 52 thereby defining a second annulus 85 therebetween of varying radial width due to the unevenness of the rings inner surface 84. Within the surface 84 are a plurality of circumferentially spaced apart recesses 86 which are in substantially the same axial plane as the outlets 76 of the oil exit passageways 68. As used herein, the phrase "axial plane" is a plane perpendicular to the engine axis 15. In the present embodiment, and as best seen in FIG. 2, the recesses 86 are radially extending slots through the scoop ring 80. Each of the plurality of recesses 86 is in fluid communication with the inner race 48 of the bearing 44 by means of passageways 88 through the shaft assembly 32, which passageways are interconnected to each other by means of an annulus 123 in the shaft 78. A more detailed description of the recesses 86 is set forth below.

In operation, oil flows along the inside surface 90 of the main shaft 16 and into the passageways 66, whereupon the radial and angular velocity of the oil increases due to the centrifugal forces created by the rotating shaft. Since the outlets 70 of the oil entrance passageways 66 and the inlets 74 to the oil exit passageways 68 are not radially aligned, the oil entering the compartments 64 from the passageways 66 must travel in a substantially axial direction to reach the exit passageway 68. Its radial velocity is thereby reduced to zero. Upon traveling through the exit passageways 68, a radial velocity is once again imparted to the oil. The velocity vector of the oil as it leaves the outlets 76 of the passageways 68 is depicted by the velocity vector 92 in FIG. 2. Note that the radial component of the velocity vector 92 is small relative to the tangential velocity of the oil. This is due to two features of the present invention: first, the hereinabove-mentioned reduction in the radial velocity to zero as the oil enters the compartment 64; and, second, the short radial distance between the inlets 74 and the outlets 76 of the passageways 68 (i.e., there is little distance or time to gain radial speed.) The oil from the oil exit passageways 68 travels across the second annulus 85 and enters the recesses 86 of the shaft assembly 32. The oil is fed from the recesses 86 to the inner race 48 of the bearing 44 via the passageways 88.

The shape of the recesses 86 in this preferred embodiment is best shown in FIGS. 1 and 2. Each recess 86 comprises a bottom wall surface 94 which faces radially inwardly; radially extending, axially spaced apart, opposed side wall surfaces 96; and, first and second scoop surfaces 98, 100, respectively. The scoop surfaces 98, 100 adjoin the opposing side wall surfaces and are substantially parallel to each other. The first scoop surface 98 faces radially inwardly, and the second scoop surface 100 faces radially outwardly. Arrows 102, 103 indicate the direction of rotation of the high and low spools 12, 10, respectively. The radially inwardly facing first scoop surface 98 of a recess 86 is circumferentially spaced from the radially outwardly facing second scoop surface 100 of that recess in the direction of rotation 102 of the shaft assembly 32. The radially inwardly facing first scoop surface 98 of one recess 86 and the radially outwardly facing second scoop surface 100 of the next adjacent (in the direction of rotation 102) recess 86 substantially intersect along a line 104 (FIG. 1) parallel to the axis 15, thereby defining a wedge 106. In a cross section perpendicular to the axis 15, the radially inwardly facing first scoop surface 98 forms an angle with a radial line (such as the line 108) passing through the intersection line 104, which angle is at least 90° and is substantially equal to or greater than the angle the velocity vector 92 makes with the same line under normal operating conditions. The object is to minimize, if not eliminate, striking of the oil against the surface 98, which would cause the oil to splash toward the annulus 85. Oil striking the surface 100 tends to splash radially outwardly toward the bottom surface 94 of the recess, which is less of a problem.

Some splashing of the oil as it enters the recesses 86 may be unavoidable; and there may be a mist of oil within and above the recesses 86, which mist can move through the annulus 85 and be lost. Over a long period of time this loss can be significant, and it is desirable to reduce the loss to a minimum. For this reason the ring 80 includes an annular depression 110 immediately aft of the recesses 86, and a plurality of circumferentially spaced apart dishlike depressions 87 immediately forward of the recesses 86. Passageways 114,116 through the ring 80 provide fluid communication between the recesses 86 and, respectively, the annulus 110 and depressions 87 for returning the recaptured oil mist to the recesses 86, with the help of centrifugal forces. To further reduce the amount of oil lost to air flowing through the annulus 85 from the cavity 65 to the cavity 124, the ring 80 includes baffles 126, 128, and 129 which reduce the radial dimension of the annulus 85 to a minimum in two axial planes causing most of the air to flow through holes 67 in the sleeve 52 into and through annulus 54 (around compartments 64) away from the area of oil transfer across annulus 85.

Figure 4:
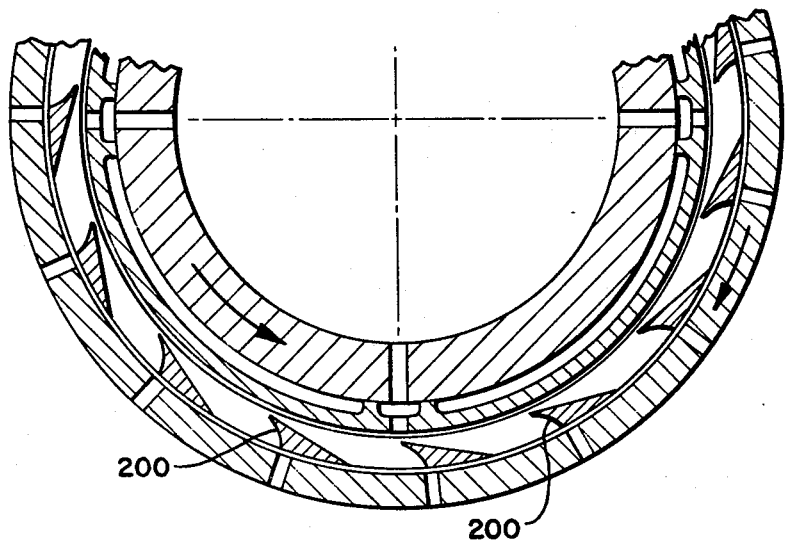
FIG. 4 is a view similar to FIG. 2 showing an alternate embodiment of the invention.

An alternate embodiment for the construction of the recesses 86 is shown in FIG. 4. The only difference is that the outwardly facing scoop surface 200 is curved rather than flat. Flat is preferable for ease of machining.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A shaft assembly comprising:
   first shaft means rotatable about an axis and including an inner shaft portion, an outer shaft portion spaced radially outwardly from said inner shaft portion, and sleeve means surrounding said inner shaft portion defining a first axially extending annulus between said sleeve means and inner shaft portion;
   second shaft means rotatable about said axis in a direction counter to the direction of rotation of said first shaft means and including means defining a shaft end portion disposed radially between said inner shaft portion and outer shaft portion of said first shaft means and having a radially inwardly facing surface spaced radially outwardly from said sleeve means defining a second axially extending annulus between said shaft end portion and sleeve means, including means defining a plurality of circumferentially and closely spaced apart recesses in said inwardly facing surface;
   first bearing means disposed between said second shaft means end portion and said first shaft means outer shaft portion, said bearing means comprising inner race means, outer race means, and rolling elements disposed between said inner and outer race means, said outer race means being attached to and fixed relative to said first shaft means outer shaft portion, said inner race means being attached to and fixed relative to said second shaft means end portion;
   said first shaft means including wall means extending radially inwardly from said sleeve means to said inner shaft portion across said first annulus defining a plurality of separate oil compartments within said first annulus, said wall means being constructed and arranged to permit substantially free flow of fluid axially through said first annulus around each of said oil compartments;
   said inner shaft portion having oil entrance passageways therethrough, at least one of said entrance passageways being in fluid communication with each of said oil compartments for bringing oil into each of said compartments, and said sleeve means having an oil exit passageway therethrough in fluid communication with each of said oil compartments for carrying oil away from each of said compartments, each of said exit passageways having an outlet in the same axial plane as said recesses in said second shaft means end portion for directing oil from said oil compartments, across said second annulus, into said recesses, said oil entrance passageways each including an outlet which opens into said oil compartment to which said oil entrance passageway corresponds, and said oil exit passageways each including an inlet which opens into said oil compartment to which said exit passageway corresponds, said entrance passageway outlet and said exit passageway inlet of each of said oil compartments being misaligned; and
   means defining second passageways in said second shaft means in fluid communication with said recesses for carrying fluid from said recesses, through said second shaft means, to said first bearing means inner race means.

2. The shaft assembly according to claim 1 wherein said oil compartments are axially elongated, and said entrance passageway outlet and exit passageway inlet are axially offset from each other within each of said oil compartments.

3. The shaft assembly according to claim 1 wherein each of said recesses includes a radially inwardly facing bottom wall surface, radially extending, axially spaced apart, opposed side wall surfaces, and first and second scoop surfaces adjoining said side wall surfaces, said first scoop surface facing radially inwardly and said second scoop surface facing radially outwardly, said first scoop surface being spaced circumferentially from said second scoop surface in the direction of rotation of said outer shaft means.

4. The shaft assembly according to claim 3 wherein said first and second scoop surfaces of each recess are flat and substantially parallel to each other, and said first scoop surface of each recess and said second scoop surface of the recess adjacent thereto substantially intersect along a line parallel to said axis defining a wedge, wherein, in a cross section perpendicular to said axis, said first scoop surface forms an angle of greater than 90° to a radial line passing through said intersection line of said first and second scoop surfaces, which angle is selected to be substantially equal to or greater than the angle of the velocity vector of the oil from said passageway outlets under normal engine operating conditions.

5. The shaft assembly according to claim 4 wherein said second shaft means end portion includes oil recapture means forward and rearward of said recesses for capturing oil mist within said second annulus, said recapture means including recapture passageways in fluid communication with said recesses to direct recaptured oil into said recesses.

* * * * *